US009121259B2

(12) United States Patent
Bryant et al.

(10) Patent No.: US 9,121,259 B2
(45) Date of Patent: Sep. 1, 2015

(54) STORING CARBON DIOXIDE AND PRODUCING METHANE AND GEOTHERMAL ENERGY FROM DEEP SALINE AQUIFERS

(75) Inventors: Steven L. Bryant, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 688 days.

(21) Appl. No.: 13/208,854

(22) Filed: Aug. 12, 2011

(65) Prior Publication Data
US 2012/0038174 A1  Feb. 16, 2012

Related U.S. Application Data

(60) Provisional application No. 61/373,680, filed on Aug. 13, 2010, provisional application No. 61/377,315, filed on Aug. 26, 2010.

(51) Int. Cl.
*F24J 3/08* (2006.01)
*E21B 41/00* (2006.01)

(52) U.S. Cl.
CPC .............. *E21B 41/0064* (2013.01); *F24J 3/08* (2013.01); *Y02C 10/14* (2013.01); *Y02E 10/10* (2013.01)

(58) Field of Classification Search
None
See application file for complete search history.

(56) References Cited

U.S. PATENT DOCUMENTS

| | | | | |
|---|---|---|---|---|
| 4,040,487 A * | 8/1977 | Cook et al. | ...................... | 166/370 |
| 4,120,158 A * | 10/1978 | Sheinbaum | ................... | 60/641.3 |
| 4,261,419 A * | 4/1981 | Probstein et al. | ............... | 166/52 |
| 4,273,189 A * | 6/1981 | Carpenter | ..................... | 166/266 |
| 4,357,802 A * | 11/1982 | Wahl et al. | .................... | 60/641.5 |
| 4,359,092 A * | 11/1982 | Jones | ........................... | 166/265 |
| 4,378,047 A * | 3/1983 | Elliott et al. | ..................... | 166/68 |
| 5,098,578 A * | 3/1992 | Gallup et al. | ................. | 210/696 |
| 6,668,554 B1 * | 12/2003 | Brown | .......................... | 60/641.2 |
| RE39,244 E * | 8/2006 | Eaton | ....................... | 405/129.28 |
| 7,172,030 B2 | 2/2007 | Horner et al. | | |
| 8,622,129 B2 * | 1/2014 | Collins et al. | ................. | 166/266 |
| 2004/0200618 A1 * | 10/2004 | Piekenbrock | .............. | 166/305.1 |
| 2005/0121200 A1 * | 6/2005 | Sivaraman | ................... | 166/370 |
| 2005/0167103 A1 * | 8/2005 | Horner et al. | ................. | 166/268 |
| 2006/0032637 A1 * | 2/2006 | Ayoub et al. | .................. | 166/369 |
| 2006/0060356 A1 * | 3/2006 | Graue et al. | ............... | 166/305.1 |
| 2007/0079617 A1 * | 4/2007 | Farmer et al. | .................. | 62/50.2 |
| 2008/0088171 A1 * | 4/2008 | Cheng | ............................. | 299/10 |
| 2009/0127127 A1 * | 5/2009 | Jones | ........................ | 205/464 |
| 2010/0258251 A1 * | 10/2010 | Nitschke | ....................... | 159/48.1 |
| 2010/0318337 A1 * | 12/2010 | Bailey et al. | ..................... | 703/10 |
| 2011/0030957 A1 * | 2/2011 | Constantz et al. | ......... | 166/305.1 |
| 2011/0035154 A1 * | 2/2011 | Kendall et al. | .................. | 702/14 |
| 2011/0272166 A1 * | 11/2011 | Hunt | ............................. | 166/402 |
| 2012/0090838 A1 * | 4/2012 | Collins et al. | ................. | 166/266 |
| 2012/0273194 A1 * | 11/2012 | Verma et al. | ............. | 166/250.01 |

FOREIGN PATENT DOCUMENTS

WO  WO 2009060177 A1 *  5/2009
WO  2012021810  2/2012

OTHER PUBLICATIONS

Taggart; Extraction of Dissolved Methane in Brines by CO2 Injection, Implication for CO2 Sequestration; 2009; Society of Petroleum Engineers; pp. 1-14.*
Nummedal et al.; Produced Water Management and Beneficial Use; May 31, 2007; National Energy Technology Laboratory; pp. 1-84; http://www.ceri-mines.org/documents/5.28.07_000.pdf.*
JLK; The Energy Potential of Geopressurized Brine: May 15, 2005; Peak Oil News & Message Boards; pp. 1-11 http://peakoil.com/forums/the-energy-potential-of-geopressurized-brine-t7951.html.*
Burton, McMillan, et al., "Eliminating Buoyant Migration of Sequestered CO2 through Surface Dissolution: Implementation Costs and Technical Challenges," SPE Reservoir Evaluation and Engineering, Jun. 2009, pp. 399-407.
Burton, McMillan, et al., "Surface Dissolution: Minimizing Groundwater Impact and Leakage Risk Simultaneously," Energy Procedia, (2009), pp. 3707-3714.
Dorfman, Myron, et al., "Potential Geothermal Resources of Texas," Bureau of Economic Geology, The University of Texas at Austin, Geological Circular 74-4, (1974), 38 pages.
Griggs, Jeremy, "A Reevaluation of Geopressured Geothermal Aquifers as an Energy Source," Proceedings of the 30th Workshop on Geothermal Reservoir Engineering, Stanford University, Jan. 31-Feb. 2, 2005, 9 pages.
Haszeldine, R. Stuart,"Carbon Capture and Storage: How Green Can Black Be?" Science , vol. 325, Sep. 25, 2009, pp. 1647-1652.
Keith, David W., et al., "Why Capture CO2 from the Atmosphere?" Science, vol. 325, Sep. 25, 2009, pp. 1654-1655.
MacDonald, R.C., et al., "U.S. Gulf Coast Geopressured-Geothermal Reservoir Simulation: Final Task Report (Year 4)," Center for Energy Studies, The University of Texas at Austin, (1980), 98 pages.
Ohkuma, Hiroshi, et al., "An Analysis of Reservoir Mechanics of Geopressured Geothermal Aquifers," Transactions, Sep. 3, 1979, 1 page.
Orr, Franklin M., et al., "Onshore Geologic Storage of CO2," Science, Sep. 25, 2009, vol. 325, pp. 1656-1658.

(Continued)

*Primary Examiner* — Doug Hutton, Jr.
*Assistant Examiner* — Anuradha Ahuja
(74) *Attorney, Agent, or Firm* — Meunier Carlin & Curfman LLC

(57) ABSTRACT

A novel idea involving the coupling of $CO_2$ geological storage with methane and/or heat production (geothermal energy) from geopressured-geothermal aquifers is described herein. The production of energy from the extracted brine offsets the cost of capture, pressurization, and injection and the subsequent injection of brine containing carbon dioxide back into the aquifer. Calculations described in the present invention indicate that this offset would reduce the cost of carbon capture and sequestration (CCS) to a point that CCS could survive in a competitive market environment without subsidies or a price on carbon.

11 Claims, No Drawings

(56) References Cited

OTHER PUBLICATIONS

Rochelle, Gary T., et al., "Amine Scrubbing for CO2 Capture," Science, (Sep. 25, 2009), vol. 325, pp. 1652-1654.
Schrag, Daniel P., et al., "Storage of Carbon Dioxide in Offshore Sediments," Science, (2009), vol. 325, pp. 1658-1659.
Smith, H. Jesse, et al., "Clearing the Air," Science, Sep. 25, 2009, vol. 325, pp. 1641.
Taggart, I., "Extraction of Dissolved Methane in Brines by CO2 Injection: Implication for CO2 Sequestration," SPE 124630, Proceedings of the Annual Technical Conference and Exhibition, New Orleans, Oct. 4-7, 2009, 1 page.
K. Romanak, et al., Bureau of Economic Geology, The University of Texas at Austin, Texas, private communication Presentation—(2010, 2011).
Bachu, Stefan, "Sequestration of CO2 in Geological Media: Criteria and Approach for Site Selection in Reponse to Climate Change" Energy Conversion & Management. 2000, vol. 41, pp. 953-970.
Brewer, Peter G., et al. "Gas Hydrate Formation in the Deep Sea: In Situ Experiments with Controlled Release of Methane, Natural Gas, and Carbon Dioxide" Energy & Fuels, 1998, vol. 12, pp. 183-188.
Kharaka, Yousif K., et al. "Potential Environment Issues of Co2 Storage in Deep Saline Aquifers Geochemical Results from the Frio-I Brine Pilot Test, Texas, USA" Applied Geochemistry. 2009, vol. 24, pp. 1106-1112.
Oldenburg, C.M., et al. "Process Modling of CO2 Injection into Natural Gas Rservoirs for Carbon Sequestration and Enhanced Gas Recovery" Energy & Fuels. 2001, vol. 15, pp. 293-298.
International Search Report and Written Opinion for PCT/US2011/047595 dated Apr. 6, 2012.
Jones, PH. 1975, "Geothermal and hydrocarbon regimes, northern Gulf of Mexico basin," in Dorfman MH and Deller RW eds. First Geopressured-Geothermal Energy Conference, Jun. 2-4, 1975, Proceedings: Austin, TX, University of Texas at Austin, Center for Energy Studies.
MacDonald RC et al. "U.S. Gulf Coats Geopressured-Geothermal Reservoir Simulation: Final Report (Year 3)," Center for Energy Studies, The University of Texas at Austin, 1979, 46 pages.
MacDonald RC et al. "Modeling Requirements for Geopressured-Geothermal Reservoir Production." Journal of Energy Resources Technology 1981, 103(4), 301-306.
Isokrari of et al. "Natural Gas Production from Geothermal Geopressured Aquifers." SPE Annual Fall Technical Conference and Exhibition, Oct. 3-6, 1976. New Orleans, LA. SPE 6037.

* cited by examiner

STORING CARBON DIOXIDE AND PRODUCING METHANE AND GEOTHERMAL ENERGY FROM DEEP SALINE AQUIFERS

CROSS-REFERENCE TO RELATED APPLICATIONS

This application is a non-provisional application of U.S. provisional patent application Nos. 61/373,680 filed on Aug. 13, 2010 and 61/377,315 filed on Aug. 26, 2010 both entitled "Storing Carbon Dioxide and Producing Methane and Geothermal Energy from Deep Saline Aquifers" which are hereby incorporated by reference in their entirety.

TECHNICAL FIELD OF THE INVENTION

The present invention relates in general to methane production, and more particularly to a method for storing $CO_2$ and producing methane and geothermal energy from an aquifer.

STATEMENT OF FEDERALLY FUNDED RESEARCH

None.

REFERENCE TO A SEQUENCE LISTING

None.

BACKGROUND OF THE INVENTION

Without limiting the scope of the invention, its background is described in connection with methods for carbon dioxide capture and methane production.

U.S. Pat. No. 7,172,030 issued to Horner et al. (2007) discloses a process for the removal of a carbon dioxide constituent from a waste gas comprising a composition of constituents including carbon dioxide and another constituent. The carbon dioxide constituent in the Horner patent is retained in a subterranean reservoir having a water presence and the process comprising the steps of (i) providing at least one injection well and at least one production well, each completed in the reservoir, (ii) injecting the waste gas through the at least one injection well, (iii) separating at least some of the carbon dioxide constituent out of the waste gas by the water presence, a separated carbon dioxide constituent being retained in the water presence for retarding the movement of the separated carbon dioxide constituent towards the at least one production well, and (iv) producing gas from the at least one production well, the produced gas being substantially free of the separated carbon dioxide constituent.

SUMMARY OF THE INVENTION

The invention described herein discloses a method for storing carbon dioxide and other greenhouse gases and producing methane, geothermal energy (heat) or both from deep saline aquifers and in particular from geopressured-geothermal geological formations containing brine with methane dissolved in the brine. The current approach to carbon capture and sequestration (CCS) from, for example, a pulverized coal-fired power plant, is not economically viable without either large subsidies or a very high price on carbon. Current schemes require roughly $\frac{1}{3}^{rd}$ of a power plant's energy for $CO_2$ capture and pressurization, and neither merchant nor regulated utilities can accommodate this magnitude of added cost. The production of energy from geothermal aquifers has evolved as a separate, independent technology from the sequestration of carbon dioxide and other greenhouse gases in deep, saline aquifers. The method of the present invention combines these two technologies and adds another: dissolution of carbon dioxide into extracted brine, which is then re-injected. The production of energy from the extracted brine in the form of methane and/or thermal energy offsets the cost of capture, pressurization and injection of the carbon dioxide into the aquifer.

One embodiment of the present invention discloses a process for producing methane from an aquifer, a reservoir, or combinations thereof comprising the steps of: collecting a native brine obtained by flowing or pumping to the surface from a first well or a set of wells made by drilling, digging, driving, boring, or combinations thereof, at a first location in the aquifer or the reservoir and extracting methane from a gas phase comprising methane in the native brine, wherein the extraction is done by contacting the native brine with carbon dioxide ($CO_2$) under pressure or by reducing pressure at a surface of the native brine, wherein the $CO_2$ displaces the gas phase comprising methane from the native brine. In some cases, free methane gas may exist or form in the aquifer (e.g., due to pressure drawdown near the production wells or by expulsion when mixed with the $CO_2$), so some methane gas will be produced at the surface in such cases without either of the operations of "contacting with $CO_2$ under pressure" or "reducing pressure at a surface". The $CO_2$ used in the extraction is in a pure form or is a mixture of gases. The process described hereinabove further comprises the step of using the methane to generate electricity, as a fuel or to convert into chemicals.

In one aspect of the present invention the process further comprises the step of storing the carbon dioxide by injection of $CO_2$ dissolved in brine after separation of the methane or injection of both supercritical $CO_2$ and $CO_2$ dissolved in brine as a two-phase mixture into a second location in the aquifer or reservoir by the use of a second well or a set of wells, wherein the second well or set of wells is created by drilling, digging, driving, boring, or combinations thereof. In another aspect the aquifer is a non-geopressured-geothermal aquifer. In another aspect the aquifer is a geopressured-geothermal aquifer. In yet another aspect the mixture of gases comprises a flue gas from an industrial emitter, a gas from a coal-fired electric power plant, a gas from a petrochemical plant or refinery or gases from any commercial, industrial or household operations. In another aspect the pure $CO_2$ or the mixture of gases is contacted with the brine at pressures of about 100 psi to 1,000 psi or greater to dissolve it into the brine before injection of the brine into the aquifer, reservoir, or combinations thereof. In another aspect the pure $CO_2$ or the mixture of gases is contacted with the brine at pressures of 100 psi, 200 psi, 300 psi, 400 psi, 500 psi, 700 psi, 900 psi, 1,000 psi, 2,500 psi, 5,000 psi, and 10,000 psi. One aspect of the process described hereinabove further comprises the step of producing of geothermal energy from the brine by the extraction of energy from the native brine by heat exchange or any other suitable method.

Another embodiment of the present invention relates to a process for producing geothermal energy from an aquifer, a reservoir, or combinations thereof comprising the steps of: (i) collecting a native brine obtained by flowing or pumping to the surface from a first well or a set of wells made by drilling, digging, driving, boring, or combinations thereof, at a first location in the aquifer or the reservoir and extracting energy from the native brine by heat exchange, wherein the extraction results in a reduction of the temperature of the native brine. The process for producing geothermal energy further comprises the steps of: contacting carbon dioxide ($CO_2$) under pressure with the native brine after extraction of the geothermal energy, wherein the $CO_2$ is in a liquid, a supercritical fluid or is a two-phase mixture, wherein the $CO_2$ is in a pure form or is a mixture of gases and injecting the native brine after extraction of geothermal energy into a second location in the aquifer or reservoir by the use of a second well or set of wells to store the $CO_2$, wherein the second well or set of wells is created by drilling, digging, driving, boring, or combinations thereof. In one aspect the aquifer is a non-geopressured-geothermal aquifer. In another aspect of the process the aquifer is a geopressured-geothermal aquifer. In yet another aspect the mixture of gases comprises a flue gas from an industrial emitter, a gas from a coal-fired electric power plant, a gas from a petrochemical plant or refinery or gases from any commercial, industrial or household operations.

In one aspect the pure $CO_2$ or the mixture of gases is contacted with the brine at pressures of about 100 psi to 1,000 psi or greater to dissolve it into the brine before injection of the brine into the aquifer, reservoir, or combinations thereof. In another aspect the pure $CO_2$ or the mixture of gases is contacted with the brine at pressures of 100 psi, 200 psi, 300 psi, 400 psi, 500 psi, 700 psi, 900 psi, 1,000 psi, 2,500 psi, 5,000 psi, and 10,000 psi. Yet another aspect of the process describes a step of producing methane from the brine by contacting carbon dioxide ($CO_2$) under pressure with the native brine or by reducing pressure at a surface of the native brine, wherein the $CO_2$ displaces a gas phase comprising methane from the native brine. The methane generated by the process described hereinabove is used to generate electricity, as a fuel or to convert into chemicals.

In yet another embodiment the present invention describes a process for producing methane and geothermal energy from an aquifer, a geopressured formation, a reservoir, or combinations thereof comprising the steps of: (i) pumping and collecting a native brine from a first location in the aquifer or the geopressured formation to a surface by the use of a first water well, wherein the first water well is created by digging, drilling, driving, boring, or combinations thereof, (ii) extracting methane from a gas phase comprising methane in the native brine, wherein the extraction is done by contacting the native brine with carbon dioxide ($CO_2$) under pressure or by reducing pressure at a surface of the native brine, wherein the $CO_2$ displaces the gas phase comprising methane from the native brine, and (iii) generating energy from the separated methane by a conversion of the methane to electricity by burning in a gas turbine or steam boiler, compressed natural gas (CNG), rocket fuel, liquefied natural gas, methane engine, and combinations and modifications thereof.

In one aspect the process further comprises injecting the brine after separation of the gas phase into a second location in aquifer or the geopressured formation by the use of a second well, wherein the second water well is created by digging, drilling, driving, boring, or combinations thereof. In another aspect the $CO_2$ is in a pure form or is a mixture of gases.

One embodiment of the present invention is related to a method for carbon capture and sequestration (CCS) in a deep saline aquifer, producing methane or both comprising the steps of: (i) providing carbon in the form of carbon dioxide ($CO_2$) or other greenhouse gases from an industrial emitter, a coal-fired electric plant, a petrochemical plant or refinery, a flue gas or any commercial, industrial or household operation, (ii) pumping and collecting a native brine from a first location in the aquifer to a surface by the use of a first water well, wherein the first water well is created by digging, drilling, driving, boring, or combinations thereof, (iii) contacting the $CO_2$ under pressure with the native brine, wherein the $CO_2$ displaces a gas phase comprising methane from the native brine, (iv) separating the gas phase comprising methane from the brine, (v) injecting the brine after separation of the gas phase into a second location in aquifer to capture and sequester the $CO_2$ in the brine by the use of a second well, wherein the second water well is created by digging, drilling, driving, boring, or combinations thereof, and (vi) generating electricity with the separated methane.

Another embodiment of the instant invention describes a closed-loop system for carbon capture and sequestration (CCS) in a geothermal aquifer, producing methane and geothermal energy or both comprising: a pumping system for pumping a native brine from a first location in the aquifer to a surface by the use of a first water well, wherein the first water well is created by digging, drilling, driving, boring, or combinations thereof, a container, a tank, a well, a reservoir, and combinations and modifications thereof for collecting the native brine at the surface, providing carbon in the form of carbon dioxide ($CO_2$) or other greenhouse gases from an industrial emitter, a coal-fired electric plant, a petrochemical plant or refinery, a flue gas or any commercial, industrial or household operation, extracting methane from a gas phase comprising methane in the native brine, wherein the extraction is done by contacting the native brine with carbon dioxide ($CO_2$) under pressure or by reducing pressure at a surface of the native brine wherein, the $CO_2$ displaces the gas phase comprising methane from the native brine, a system for separating the gas phase comprising methane from the brine, an injection system for injecting the brine after separation of the gas phase into a second location in aquifer to sequester the $CO_2$ in the brine by the use of a second well, wherein the second water well is created by digging, drilling, driving, boring, or combinations thereof, and an energy generating system for converting the separated methane to electricity by burning in a gas turbine or steam boiler, compressed natural gas (CNG), rocket fuel, liquefied natural gas, methane engine, and combinations and modifications thereof.

BRIEF DESCRIPTION OF THE DRAWINGS

None.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "aquifer" as used herein relates to a water-bearing bed or stratum of permeable rock, sand or gravel capable of yielding considerable quantities of water to wells or springs. As used herein, the term "geothermal aquifer" refers to a porous zone in the earth's crust which contains water which is at least about 60° C. As used herein the term "geopressured aquifer" refers to a porous zone in the earth's crust, which contains water at a pressure exceeding the pressure corresponding to the normal hydrostatic value of about 0.45 psi/ft.

The term "brine" as used herein in various embodiments is used in a broad sense to denote the entire range of concentrations of aqueous solutions of water soluble inorganic compounds, for example, natural saline water containing sodium chloride, including brackish water, sea water, and saturated or nearly saturated brines, such as the brine in the Great Salt Lake or brines obtained from wells. In addition to sodium chloride-containing solutions, other brines to which the process may be applied include aqueous solutions of dissolved mineral salts, for examples, halides, carbonates and sulfates of sodium, potassium, lithium, calcium, magnesium, zinc and copper.

The term "geothermal" as used in the specification and claims refers to those unusual occurrences of nature when hot fluids such as water and gas occur in pockets beneath the earth and have been tapped for their heat content.

The term "flue gas" as used herein includes the exhaust gas from any sort of combustion process (including coal, oil, natural gas, etc.).

The term "methane" as used herein includes natural gas comprising the elements carbon and hydrogen.

The term "petrochemical plant or refinery" as used herein refers to an industrial processing plant where crude oil is processed and refined into commercially valuable petroleum products, such as gasoline, diesel fuel, liquefied petroleum game, etc.

The term "supercritical fluid" as used in the specification and claims refers to the state of matter of a material above its critical point, i.e., a critical temperature, $T_e$, and critical pressure, $P_e$, at which two phases of a substance, in equilibrium with each other, become identical, forming one phase. The term "supercritical $CO_2$" as used herein refers to $CO_2$ that exhibits a pressure and temperature equal to or above its critical pressure and critical temperature (73.8 bar; 31.1° C.).

The term "wellbore" as used in the present application is defined as a bore hole extending from the earth surface to a target hydrocarbon-bearing formation. Thus, a wellbore is a conduit providing fluid communication between the surface and the target formation. The term "well" as used herein is synonymous with the term "wellbore". The term "boring" is intended to encompass any method of forming a passage in an earth formation extending laterally or radially from a wellbore. The term "drilling", likewise, will be taken to include exploration for and extraction of materials from the earth as well as formation of a deep hole through which the materials are extracted.

The term "psi" as used throughout the specification and claims is defined as pounds per square inch gauge pressure.

The term "gas turbine" as used herein refers to any turbine system having a compression section, combustion section, and turbine section.

The term "compressed natural gas (CNG)" as used herein refers to a fossil fuel substitute for gasoline (petrol), diesel, or propane/LPG.

A "greenhouse gas" of the present invention may include any gas which is known to contribute to the greenhouse effect. The term "greenhouse effect" herein is intended to encompass the environmental effects of global warming and/or acid rain. The "greenhouse gas" may comprise methane ($CH_4$), or any carbon oxide ($CO_x$) or nitrogen oxide ($NO_x$) gas. A carbon oxide of the present invention may comprise carbon monoxide (CO) or carbon dioxide ($CO_2$). The "greenhouse gas" may further comprise any carbon-halogen or sulfur-halogen containing gas. A carbon-halogen containing gas may comprise methyl bromide ($CH_3Br$) or carbon tetrachloride ($CCl_4$). A carbon-halogen containing gas may further comprise a gas selected from hydrofluorocarbons (HFCs), chlorofluorocarbons (CFCs), and/or perfluorocarbons (PFCs).

The term "carbon sequestration" as used in the present application generally refers to the long-term storage of carbon in a multitude of ways, including, but not limited to, terrestrial, underground, or ocean environments to reduce the buildup of carbon dioxide in the atmosphere.

The invention involves producing by extraction or production wells brine from an aquifer, e.g., a geopressured-geothermal aquifer, containing methane dissolved in the brine, and/or producing methane gas that has been exsolved from the brine by contact with injected $CO_2$ by the use of extraction or production wells. Brine with methane dissolved in it and/or methane gas is extracted from one or more production wells at the same time that carbon dioxide ($CO_2$) is dissolved into the produced brine and injected in one or more injection wells. In some cases however, free methane gas may exist or form in the aquifer (e.g. due to pressure drawdown near the production wells or by expulsion when mixed with the $CO_2$), so some methane gas will be produced at the surface in such cases without either of the operations of "contacting with $CO_2$ under pressure" or "reduced the pressure at the surface" as indicated herein. Although it may not be common, it is possible for a small gas cap to already exist in the aquifer or to form in the aquifer while pumping it.

The produced methane is sold into the natural gas supply or used directly as a fuel or chemical and in addition thermal energy is extracted from the hot produced brine before it is mixed with carbon dioxide and injected back into the same formation. The process thus is a "closed loop" with respect to brine, and a waste product ($CO_2$) replaces a valuable product ($CH_4$) in the aquifer.

An important application of the present invention is associated with the capture of carbon dioxide from a large industrial emitter such as a coal-fired electricity-generating power plant or a petrochemical plant or a refinery among many other possible sources of carbon dioxide or gases containing carbon dioxide. The cost of capturing and storing that $CO_2$, which is a key technology for mitigating greenhouse gas emissions, can be offset significantly by the revenue from selling the methane and/or geothermal energy of the hot brine from sufficiently deep, hot formations. Moreover, the simultaneous extraction and injection of brine through two sets of wells can be done in such a way that very little pressure buildup occurs in the formation whereas when fluids are injected without any production, as in the conventional way of storing $CO_2$ in deep, saline aquifers, the storage will often be severely limited by the pressure buildup in the aquifer. Still another method of accomplishing this purpose would be to inject both brine and gases containing carbon dioxide or other greenhouse gases while producing brine from other wells in the same aquifer.

One unusual feature of the present invention is the dissolution of $CO_2$ into the brine. The technology currently anticipated for geologic $CO_2$ storage is the injection of bulk phase (supercritical) $CO_2$. The other unusual feature is the production of methane and/or thermal energy from the extracted brine. Other proposed strategies for storing $CO_2$ in saline aquifers that extract brine do not recover valuable products from the brine.

The cost of capturing and storing anthropogenic $CO_2$ is large. The method of the present invention will reduce that cost and greatly increase the acceptance and feasibility of this method for mitigating "greenhouse" gas emissions. In addition the present invention possesses number of advantages over existing technologies: current technologies for injecting $CO_2$ in saline aquifers do not anticipate extraction from those aquifers. Consequently, the pressure buildup will restrict the injection rate since the pressure must be kept below a certain maximum value to avoid unacceptable risks associated such as fracturing of the aquifer's seal. It has been proposed to extract brine to relieve this problem, but this leads to the issue of disposing the extracted brine. The advantages of the present invention are that (i) it closes the loop (the extracted brine is reinjected into the same formation) while deriving revenue from methane and thermal energy removed from the brine, (ii) injecting $CO_2$ dissolved in brine into these deep geopressured formations does not require large injection pressures, whereas injecting bulk phase $CO_2$—which would also sequester $CO_2$ and drive methane ($CH_4$) out of solution—would require very large injection pressures in the surface equipment. This is expensive and imposes greater safety concerns. The present invention requires significantly smaller injection pressures, because the greater density of brine compared to the $CO_2$ gives a much larger bottom-hole pressure in these deep formations, and (iii) the brine in these formations is hot and could be used as a source of geothermal energy.

The conventional vehicle for carbon ($CO_2$) capture and pressurization from flue gas requires upwards of 30% of a power plant's energy (1-6), making the cost of retrofitting the existing plants for carbon capture prohibitive. This energy penalty cannot be significantly reduced because of the thermodynamic limit [~12%, (3)] for conventional capture methods and pressurization requirements. In addition, fundamental problems with current geological carbon sequestration methods (GCS) include, but are not limited to, the need to pressurize sufficiently to overcome aquifer pressure for injection, the increase in aquifer pressure resulting from limited $CO_2$ injectivity and from limited brine diffusivity in the aquifer, and the risk of leakage of the buoyant $CO_2$ phase after injection. Beyond these technical problems is the economic challenge: CCS in aquifers is "pure cost" with no offsetting benefit [in the absence of a cost for $CO_2$ emission (e.g., cap and trade or carbon tax)].

To address these problems the present inventors developed an approach to $CO_2$ injection, taking advantage of both dissolved methane and geothermal energy from saline aquifers. Several very important differences from conventional CCS are notable. First, instead of injecting $CO_2$ directly into the aquifer, native brine is pumped from the aquifer to the surface, and $CO_2$ captured from the flue gas is injected under modest pressure (~1,000 psi) into the saline solution. Pressurization is required to return the saline water with dissolved $CO_2$ into the aquifer (through a different well), but injection is aided by the density of the $CO_2$-saturated brine. Per unit volume of fluid this is less costly energetically than pumping the same amount of $CO_2$ directly into a geopressured aquifer. Larger volumes of brine are needed, however, so that the total pumping costs are comparable to conventional CCS. Secondly, when $CO_2$ contacts water containing dissolved methane, almost all of the dissolved methane is expelled from solution (7) and forms a gas phase since methane is supercritical at the temperature of interest. The production of methane during the injection of supercritical $CO_2$ into an aquifer has already been observed in the field (8). Thus, methane can be extracted and used to produce energy. Thirdly, the saline water comes to the surface at about 300° F. and thus contains significant amounts of thermal energy that can be used in various ways. Fourthly, the $CO_2$-saturated brine is denser than the native brine, which eliminates buoyant leakage and thus provides a much more robust permanence for $CO_2$ storage.

Formations of abnormally high pressure and temperature lie along the Gulf Coast of the United States at depths exceeding 10,000 feet. The water is often saturated or nearly saturated with dissolved methane (9, 10). During the 1970s, the U.S. Department of Energy funded several studies related to the development of these geopressured-geothermal reservoirs as an energy resource, both from the standpoint of heat recovery and as a source of natural gas (11). Several "wells of opportunity" were tested on a short-term basis, primarily to assess the amount and quality of the natural gas associated with geopressured-geothermal waters. Table 1 from (11) is a summary of some of the results from test wells showing substantial production of methane. For example, the Pleasant Bayou No. 2 well produced 330 million SCF of natural gas from 1979 to 1983.

The methane content of these brines is on the order of 35 SCF per barrel of brine. Because these aquifers are regionally extensive, the total amount of methane is enormous with estimates ranging from 3,000 to 46,000 TcF (11). In addition to the well characterized geopressured-geothermal aquifers along the Gulf Coast of Texas and Louisiana, there are likely to be other large sources of methane dissolved in normally pressured saline aquifers in the U.S.; located in most geological basins where oil and gas are produced including but not limited to, the mid west, mid continent and west coast.

The energy content of the hot brine is also very significant. The temperature of Gulf Coast geothermal aquifers is about 300° F., and the energy that can be extracted from produced brine is of the same order of magnitude as the energy from the produced methane. For example, the change in enthalpy when the temperature of one barrel (42 gallons) of hot water is reduced from 300° F. to 100° F. is 70,000 Btu, which is about twice the energy content of the dissolved methane.

The manner of injecting $CO_2$ is a crucial component of this approach. The conventional and most straightforward way to sequester $CO_2$ is to inject it directly into the aquifer as a supercritical fluid. When the $CO_2$ mixes with the methane-saturated brine in the aquifer, the methane will come out of solution and flow upward where it can be captured and produced from a production well at a higher elevation in the aquifer (7). However, injecting only $CO_2$ requires another aquifer or separate costly injection wells in the same aquifer to receive the extracted brine. Moreover, calculations by the inventors show that it is preferable to inject brine containing dissolved $CO_2$ rather than just $CO_2$. In this case, injected brine displaces the native brine bearing dissolved methane toward the production wells in the aquifer. The displacement of one brine by another brine is a much more efficient process than the displacement of a less viscous and less dense fluid such as supercritical $CO_2$, in the sense that one volume of injected brine displaces nearly one volume of native brine, while one volume of injected supercritical $CO_2$ may displace only a small fraction of native brine due to well known mechanisms for preferential flow (gravity override by the less dense $CO_2$ and fingering of the less viscous $CO_2$ phase through the brine phase). The brine-displacement-by-brine process thus results in a much higher recovery of the methane and thermal energy (heat) than injecting supercritical $CO_2$ and has other significant advantages, notably the ability to control the aquifer backpressure that limits injection rates in conventional CCS. Bryant and co-workers (17, 18) have proposed injecting dissolved $CO_2$ in conventional aquifers as a way to eliminate buoyant leakage and reduce the "footprint" of pressure and fluid displacement, but they did not couple this process with the production of methane and/or geothermal energy.

aquifers. Brine saturated with $CO_2$ was injected at 200,000 B/D, and brine saturated with methane was produced at the same rate to keep the aquifer pressure constant and avoid problems associated with increasing or decreasing pressure. The equation of state was tuned to fit experimental solubility of $CO_2$ and $CH_4$ in brine under these conditions.

TABLE 1

Summary of field data taken from (11).

|  | Pleasant Bayou No. 2 | Amoco Fee No. 1 | Girouard No. 1 | Saldana No. 2 | Prairie Canal No. 2 | Crown Zellerbach No. 1 |
|---|---|---|---|---|---|---|
| Parish or County | Brazoria, TX | Cameron, LA | Lafayette, LA | Zapata, TX | Calcasieu, LA | Livingston, LA |
| Shut-in Surface Pressure, psi | — | — | 6,695 | 2,443 | 6,420 | 2,736 |
| Max Flow Rate, BWPD | 28,900 | 36,500 | 15,000 | 1,950 | 7,100 | 2,832 |
| Max Gas Rate, Mcfd | — | — | 600 | 105 | 390 | 93 |
| Produced Gas-Water Ratio, scf/bbl | 23 | 27-29.8 | 40 | 47-54 | 43-55 | 33 |
| Water Salinity-TDS, ppm | 131,320 | 97,800 | 23,500 | 12,800 | 42,600 | 32,000 |
| Carbon Dioxide, mole % | 11.28 | 9.92 | 6 | 26.4-16.4 | 9.6 | 22.6 |
| Formation | Lower Miocene Oligocene | Upper Oligocene | Frio-Marg. Tex No. 1 | Upper Wilcox | Hackberry, Upper Frio | Tuscaloosa |
| Perforations, ft | 14,644-14,704 | 15,160-15,470 | 14,774-14,819 | 9,745-9,820 | 14,782-14,820 | 16,720-16,750 |
| Net Interval, ft | 53 | 333 | 91 | 79 | 14 | 35 |
| Original Reservoir Pressure, psi | 11,168 | 12,799 | 13,203 | 6,627 | 12,942 | 10,075 |
| Original Reservoir Temperature, ° F. | 305 | 291 | 274 | 300 | 294 | 327 |
| Porosity-Log, % | 18 | 16 | 26 | 16 | 28 | 17 |
| Permeability-Test, md | 192 | 160 | 200-240 | 16.7 | 95 | 16.6 |

The manner of injecting $CO_2$ is a crucial component of this approach. The conventional and most straightforward way to sequester $CO_2$ is to inject it directly into the aquifer as a supercritical fluid. When the $CO_2$ mixes with the methane-saturated brine in the aquifer, the methane will come out of solution and flow upward where it can be captured and produced from a production well at a higher elevation in the aquifer (7). However, injecting only $CO_2$ requires another aquifer or separate costly injection wells in the same aquifer to receive the extracted brine. Moreover, calculations by the inventors show that it is preferable to inject brine containing dissolved $CO_2$ rather than just $CO_2$. In this case, injected brine displaces the native brine bearing dissolved methane toward the production wells in the aquifer. The displacement of one brine by another brine is a much more efficient process than the displacement of a less viscous and less dense fluid such as supercritical $CO_2$, in the sense that one volume of injected brine displaces nearly one volume of native brine, while one volume of injected supercritical $CO_2$ may displace only a small fraction of native brine due to well known mechanisms for preferential flow (gravity override by the less dense $CO_2$ and fingering of the less viscous $CO_2$ phase through the brine phase). The brine-displacement-by-brine process thus results in a much higher recovery of the methane and thermal energy (heat) than injecting supercritical $CO_2$ and has other significant advantages, notably the ability to control the aquifer backpressure that limits injection rates in conventional CCS. Bryant and co-workers (17, 18) have proposed injecting dissolved $CO_2$ in conventional aquifers as a way to eliminate buoyant leakage and reduce the "footprint" of pressure and fluid displacement, but they did not couple this process with the production of methane and/or geothermal energy.

Table 2 lists the properties of an idealized geopressured-geothermal aquifer with characteristics such as porosity, permeability, temperature and pressure typical of those in the Gulf Coast. An equation-of-state compositional simulator with a coupled wellbore model was used to study the proposed process for this and similar geopressured-geothermal aquifers. Brine saturated with $CO_2$ was injected at 200,000

The brine saturated with $CO_2$ is injected until it reaches the production well. At this time, the simulations show that 560 billion scf (29.4 million tons) of $CO_2$ has been stored in the aquifer, and about 56% of the original methane (98 billion scf) has been produced. The molar ratio of stored $CO_2$ to produced methane is 5.7, which is close to the solubility ratio under these conditions. Other simulations for aquifers with different net pay, well rates and so forth show very similar ratios, so the results can be easily scaled using this ratio. At $8 per million Btu, the value of the methane would be $784 million. If ½ of the heat could be used by reducing the temperature of the hot water from 300° F. to 100° F., then at the same value per Btu it would be worth about $800 million for a total revenue of $1.584 billion. Assuming $50 per ton for capturing and pressurizing $CO_2$ from power plants using conventional CCS, the total revenue exceeds the total cost of $1.47 billion needed to capture and pressurize the $CO_2$ and it eliminates the need to build new power plants to provide the enormous amount of energy needed for that purpose. The actual economics will also depend on the cost of the wells and facilities among other factors and requires further analysis.

TABLE 2

Summary of aquifer properties

| Length and width, ft | 10000 |
|---|---|
| Thickness, ft | 2000 |
| Depth at top of the formation, ft | 15000 |
| Temperature, ° F. | 300 |
| Initial Pressure, psi | 12000 |
| Porosity | 0.15 |
| Horizontal Permeability, md | 200 |
| Vertical Permeability, md | 20 |
| Initial $CH_4$ in place, Billions of scf | 175 |
| Initial brine in place, Billions of stb | 5.0 |

Although much research has been done and is currently underway to investigate $CO_2$ geological storage, the coupling of $CO_2$ geological storage with methane and/or thermal energy production from geopressured-geothermal aquifers as described herein is novel. The potential for reducing the cost of $CO_2$ capture and storage from pulverized coal-fired power plants and other sources by producing large quantities of valuable methane and/or geothermal energy is very significant.

It is contemplated that any embodiment discussed in this specification can be implemented with respect to any method, kit, reagent or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C or combinations thereof" is intended to include at least one of: A, B, C, AB, AC, BC or ABC, and if order is important in a particular context, also BA, CA, CB, CBA, BCA, ACB, BAC or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims

REFERENCES

U.S. Pat. No. 7,172,030: *Applications of Waste Gas Injection into Natural Gas Reservoirs.*
  1. H. Jesse Smith et al., Science 325, 1641 (2009).
  2. R. S. Haszeldine, Science 325, 1647 (2009).
  3. G. T. Rochelle, Science 325, 1652 (2009).
  4. D. W. Keith, Science 325, 1654 (2009).
  5. F. M. On, Jr., Science 325, 1656 (2009).
  6. D. P. Schrag, Science 325, 1658 (2009).
  7.1. Taggart, Society of Petroleum Engineers, SPE 124630, Proceedings of the Annual Technical Conference and Exhibition, New Orleans, 4-7 October (2009).
  8. K. Romanak, et al., Bureau of Economic Geology, The University of Texas at Austin, Tex., private communication (2010).
  9. M. Dorfman and R. O. Kehle, Bureau of Economic Geology, The University of Texas at Austin, Geological Circular 74-4 (1977).
  10. P. H. Jones, Proceedings, First Geopressured Geothermal Energy Conference, Austin, Tex., Ed. M. Dorfman and R. W. Deller (1975).
  11. J. Griggs, Proceedings of the $30^{th}$ Workshop of Geothermal Reservoir Engineering, Stanford University, an 21-Feb. 2 (2005).
  12. H. Ohkuma et al., Geothermal Resources Council, Transactions, 3 September (1979).
  13. R. C. MacDonald et al., Final Report (Year 3), Center for Energy studies, The University of Texas at Austin (1979).
  14. R. C. MacDonald et al., Final Report (Year 4), Center for Energy studies, The University of Texas at Austin (1980).
  15. O. Isokari and R. M. Knapp, Society of Petroleum Engineers SPE 6037, $51^{st}$ Annual Fall Technical Conference, New Orleans, 3-6 October (1976).
  16. R. C. MacDonald et al., J. Energy Resources Technology 103 (1981).
  17. M. Burton and S. L. Bryant, Energy Procedia 1(1): 3707-3714, ISSN 1876-6102, DOI: 10.1016/j.egypro.02.169 (2009).
  18. M. Burton and S. L. Bryant, Society of Petroleum Engineers, SPE Reservoir Evaluation & Engineering, 12, 399 (2009).

What is claimed is:

1. A process for obtaining methane from beneath a surface of the Earth, the process comprising:
  collecting a native brine comprising methane at the surface from a first well;
  contacting the collected native brine comprising methane with a gas comprising carbon dioxide ($CO_2$) thereby obtaining the methane from the collected native brine and forming a composition comprising the collected native brine and the gas comprising $CO_2$; and
  injecting the composition comprising the collected native brine and the gas comprising $CO_2$ into a second well.

2. The process of claim 1, wherein the gas is pure $CO_2$ or a mixture of $CO_2$ and one or more gases.

3. The process of claim 1, wherein the composition further comprises supercritical $CO_2$.

4. The process of claim 1, wherein the first well is in a non-geopressured-geothermal aquifer.

5. The process of claim 1, wherein the first well is in a geopressured-geothermal aquifer.

6. The process of claim 1, wherein the gas comprises a flue gas from an industrial emitter, a gas from a coal-fired electric power plant, a gas from a petrochemical plant or refinery, or a gas from a commercial, industrial or household operations.

7. The process of claim 1, wherein the gas is contacted with the collected native brine at a pressure of from about 100 psi to about 1,000 psi.

8. The process of claim 1, further comprising extracting geothermal energy from the collected native brine comprising methane by heat exchange.

9. A process for obtaining methane beneath a surface of the Earth, the process comprising:
- collecting a native brine comprising methane at the surface from a first well;
- contacting the collected native brine comprising methane with a gas comprising carbon dioxide ($CO_2$) thereby obtaining the methane from the collected native brine and forming a composition comprising the collected native brine and the gas comprising $CO_2$;
- injecting the composition comprising the collected native brine and the gas comprising $CO_2$ into a second well; and
- burning the methane in a gas turbine or steam boiler to generate electricity, or
- compressing the methane to form compressed natural gas (CNG), rocket fuel, liquefied natural gas, or combinations thereof.

10. The process of claim 9, wherein the gas is pure $CO_2$ or a mixture of $CO_2$ and one or more gases.

11. A method for carbon capture and sequestration (CCS) and obtaining methane in a deep saline aquifer beneath a surface of the Earth, the method comprising:
- collecting a native brine comprising methane at the surface from a first well;
- contacting the collected native brine comprising methane with a gas thereby obtaining the methane from the collected native brine and forming a composition comprising the collected native brine and the gas;
- wherein the gas comprises carbon dioxide ($CO_2$) or other greenhouse gases, said gas being from an industrial emitter, a coal-fired electric plant, a petrochemical plant or refinery, a flue, or any commercial, industrial, or household operation;
- injecting the collected native brine comprising the gas into a second well thereby capturing and sequestering the gas in the native brine in the second well, and
- burning the methane in a gas turbine or steam boiler to generate electricity.

* * * * *